United States Patent Office 2,849,486
Patented Aug. 26, 1958

2,849,486
NITROGENOUS CONDENSATION PRODUCT

William F. Tousignant, Midland, Mich., assignor to The Dow Chemical Company, Midland, Mich., a corporation of Delaware No Drawing. Application October 26, 1955
Serial No. 543,040

2 Claims. (Cl. 260—566)

This invention relates to a new nitrogenous condensation product and a method for its preparation.

Nitrogenous condensation products obtained by the reaction of formaldehyde with aliphatic polyamine or substitution products of the same are known in the art. These products have been employed for varying purposes as textile impregnants to impart thereto such properties as water repellency and crease resistance, as flocculating agents, plasticizers and thickeners. These products are either colored, varying from yellow to deep red and brown, or quickly darken on storage or in use. Such presence or development of color is undesirable in applications with white or colorless materials.

The product of the present invention is prepared by condensing formaldehyde with 3,3′ diaminodipropylamine. Preferred procedures include carrying out the reaction with from 2.0 to 2.5 moles of formaldehyde for each mole of the amine. The condensation product is obtained as a clear, colorless gel which may be dehydrated to a white solid. The product is readily soluble in alcohol and water and gives colorless solutions, but is of very low solubility in non-polar solvents such as benzene. This substance is advantageously employed as a preservative or antioxidant where the presence of color or color formation would be objectionable. It is especially valuable as a parasiticide for the control of bacterial and fungal organisms.

The reactants used in the preparation of the product are readily obtainable. The formaldehyde reactant may be employed in any suitable form. Formalin, the commercially available 37 percent aqueous solution of formaldehyde, is operable in and constitutes a preferred embodiment of the invention. Paraformaldehyde may also be used, either in water solution or with water present in the reaction mixture.

3,3′-diaminodipropylamine is available commercially. It may be prepared by the catalytic reduction of 3,3′-iminobispropylnitrile which is readily obtained by the reaction of acrylonitrile with ammonia.

In the preferred method for the preparation of the condensation product, an aqueous solution of formaldehyde (such as formalin) is added with stirring and cooling to 3,3′-iminobispropylamine. The rate of combining the reactants is dependent on the initial temperature, the concentration of formaldehyde in the aqueous solution and the efficiency of cooling. The temperature of the reaction mixture is preferably kept at or below 50° C.

The product obtained on completion of the reaction is a clear, viscous aqueous composition which solidifies into a water white gel. Water may be added to the gel to give a colorless solution. The gel may also be dehydrated to give a white solid; the removal of the water is preferably carried out under reduced pressure. The color of the product does not readily change on storage. The gel form of the product after standing three months in clear, colorless bottles and unprotected from light, showed only a slight tendency to become yellow. Heating the gel for 24 hours at 80° C. caused only a very slight yellowing. The product has a slight pyridine-like odor and its dilute aqueous solution has a pH of 10.5–10.7. Examination of the infrared spectrum of the product showed the presence of a heteropolar bond, and molecular weight determinations demonstrated the non-polymeric nature of the product. The chemical configuration of the condensation product is thought to be:

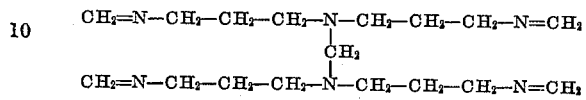

The following examples illustrate the invention but are not to be construed as limiting.

Example 1

101.4 grams (1.25 moles) of a 37 percent aqueous formaldehyde solution was added dropwise to 65.6 grams (0.5 mole) of 3,3′-diaminodipropylamine while the reaction mixture was stirred and cooled to maintain the temperature at about 40° to 50° C. The addition required about 15 minutes. On completion of the addition the reaction mixture was a colorless, water-soluble gel. The gel was placed in a vacuum oven at 50° C. under 25 millimeters pressure for 18 hours to obtain the dehydrated product. The loss in weight incurred by this procedure amount to 84.2 grams. The expected loss in weight calculated on the basis of the water present in the aqueous formaldehyde solution plus the water liberated by the reaction of formaldehyde with amine was 86.4 grams. The condensation product contained 63.86 percent carbon and 10.71 percent hydrogen. Nitrogen determinations on the product gave an average value of 26.8 percent. The theoretical values for the elements based on the postulated structure of the condensation product are 63.35 percent carbon, 10.55 percent hydrogen and 26.08 percent nitrogen. Molecular weight determinations on the product gave values slightly lower than the theoretical molecular weight of 322, indicating a non-polymeric product. Infrared analysis indicated the presence of a carbon to hydrogen bond, a heteropolar double bond and a secondary or tertiary amine linkage. The product has a density of 1.162.

Example 2

Formaldehyde was condensed with 3,3′-diaminodipropylamine by adding 210.0 grams (2.5 moles) of a 36 percent aqueous solution of formaldehyde to 131.0 grams (1.0 mole) of the amine while the reaction mixture was stirred and cooled to keep the temperature in the range of 40° to 50° C. On completion of the addition the mixture solidified to give a condensation product as a water white gel consisting of 47.5 percent solids and 52.5 percent water.

Example 3

975.6 grams (12.0 moles) of a 37 percent aqueous formaldehyde solution was added dropwise with stirring to 786.0 grams (6.0 moles) of 3,3′-diaminodipropylamine over a period of about one hour and fifteen minutes. The reaction temperature was maintained at about 40° to 50° C. during this period. The condensation product was obtained as a colorless gel consisting of about 50 percent solids.

The product prepared as described in the preceding examples is useful for the control of bacterial and fungal organisms. In a representative operation, complete inhibition of growth was obtained when nutrient agar plates containing 0.05 percent condensation product were swabbed with *Aspergillus terreus* and the plates incubated for four days at 30° C.

I claim:
1. A composition comprising a colorless, water soluble condensation product obtained by the reaction of from 2.0 to 2.5 moles of formaldehyde with one mole of 3,3'-diaminodipropylamine at a temperature not greater than 50° C.

2. A method for preparing a condensation product which comprises the step of spontaneously condensing 2.0 to 2.5 moles of formaldehyde with 1 mole of 3,3'-diaminodipropylamine in the presence of water at a reaction temperature not in excess of 50° C. for a period sufficient to allow completion of the reaction.

References Cited in the file of this patent

UNITED STATES PATENTS

| | | |
|---|---|---|
| 1,840,932 | Caldwell | Jan. 12, 1932 |
| 2,259,169 | Little | Oct. 14, 1941 |
| 2,265,051 | Adams | Dec. 2, 1941 |
| 2,643,977 | Huges | June 30, 1953 |